US012707163B2

(12) United States Patent
Cutrignelli

(10) Patent No.: US 12,707,163 B2
(45) Date of Patent: Aug. 11, 2026

(54) SENSOR EXPOSURE MODE CONTROL AND SENSOR EXPOSURE MODE CONTROL METHOD

(71) Applicant: Sony Semiconductor Solutions Corporation, Kanagawa (JP)

(72) Inventor: Luca Cutrignelli, Brussels (BE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 159 days.

(21) Appl. No.: 18/712,825

(22) PCT Filed: Nov. 29, 2022

(86) PCT No.: PCT/EP2022/083669
§ 371 (c)(1),
(2) Date: May 23, 2024

(87) PCT Pub. No.: WO2023/104589
PCT Pub. Date: Jun. 15, 2023

(65) Prior Publication Data

US 2025/0024167 A1 Jan. 16, 2025

(30) Foreign Application Priority Data

Dec. 6, 2021 (EP) ..................................... 21212534

(51) Int. Cl.
*H04N 25/535* (2023.01)
*G01S 7/481* (2006.01)
(Continued)

(52) U.S. Cl.
CPC ......... *H04N 25/535* (2023.01); *G01S 7/4816* (2013.01); *G01S 7/4915* (2013.01); *G01S 17/894* (2020.01); *H04N 25/78* (2023.01)

(58) Field of Classification Search
CPC .... H04N 25/535; H04N 25/78; G01S 7/4816; G01S 7/4915; G01S 17/894; G01S 7/4868; G01S 7/487
See application file for complete search history.

(56) References Cited

U.S. PATENT DOCUMENTS

2005/0051707 A1* 3/2005 Bamji .................. H04N 25/587 250/214 R
2006/0114333 A1* 6/2006 Gokturk ................ G01S 7/4868 348/222.1

(Continued)

FOREIGN PATENT DOCUMENTS

WO 2020/049203 A1 3/2020
WO 2021/069407 A1 4/2021

OTHER PUBLICATIONS

International Search Report and Written Opinion mailed on Feb. 20, 2023, received for PCT Application No. PCT/EP2022/083669, filed on Nov. 29, 2022, 7 pages.

*Primary Examiner* — Nhan T Tran
(74) *Attorney, Agent, or Firm* — XSENSUS LLP

(57) ABSTRACT

A control for a time-of-flight sensor, the time-of-flight sensor including a plurality of pixels configured to perform photoelectric conversion, the control comprising circuitry configured to: operate the time-of-flight sensor in a continuous exposure mode in which the plurality of pixels performs photoelectric conversion during a continuous exposure time interval and control read-out of the plurality of pixels after the continuous exposure time interval; and operate the time-of-flight sensor in a split exposure mode, in response to a detected saturation of pixels of the plurality of pixels, in which the plurality of pixels performs photoelectric conversion during each of a plurality of split exposure time intervals and control read-out of the plurality of pixels after each of the plurality of split exposure time intervals, wherein (Continued)

a length of each of the plurality of split exposure time intervals is shorter than the length of the continuous exposure time interval.

21 Claims, 9 Drawing Sheets

(51) Int. Cl.

| | |
|---|---|
| ***G01S 7/4915*** | (2020.01) |
| ***G01S 17/894*** | (2020.01) |
| ***H04N 25/78*** | (2023.01) |

(56) References Cited

U.S. PATENT DOCUMENTS

2017/0142311 A1* 5/2017 Kurata .................. H04N 5/265
2018/0253404 A1 9/2018 Moore et al.
2020/0033456 A1* 1/2020 Wang .................... G01S 7/4865
2020/0058698 A1 2/2020 Bulteel

* cited by examiner

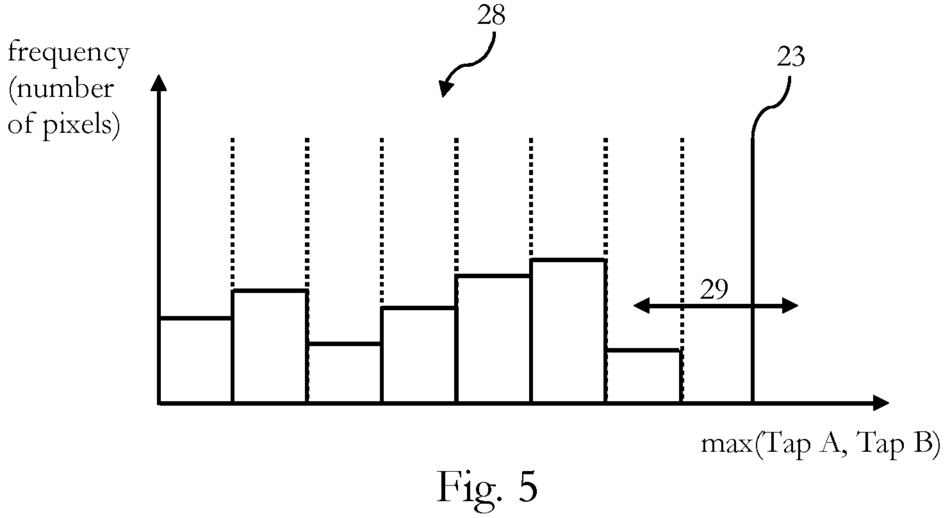
Fig. 5
Fig. 6A
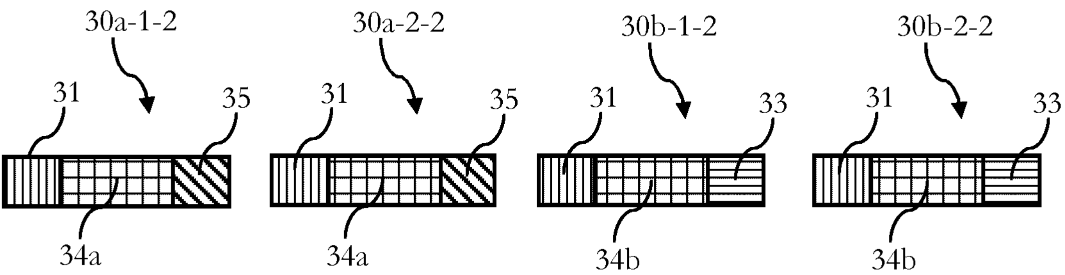
Fig. 6

Fig. 7A
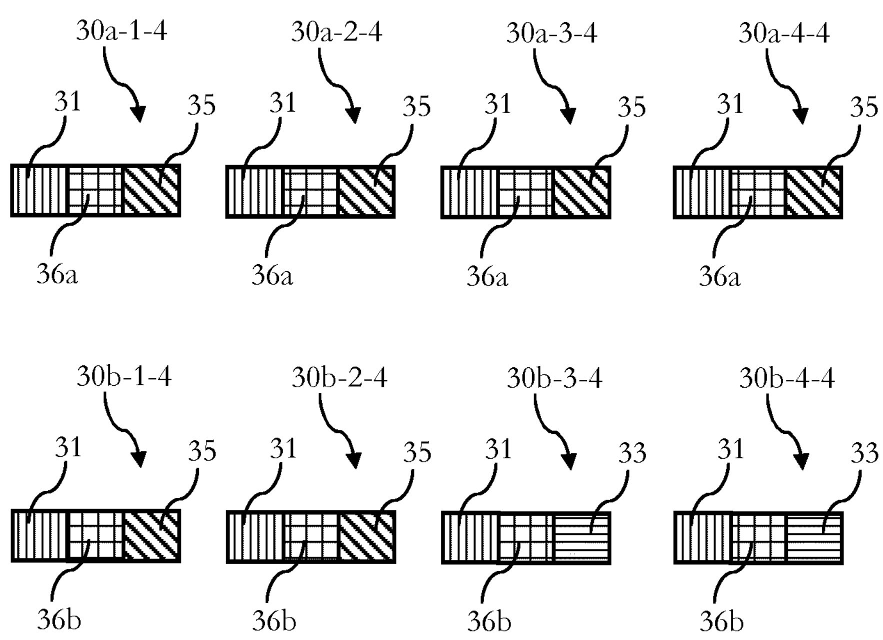
Fig. 7B
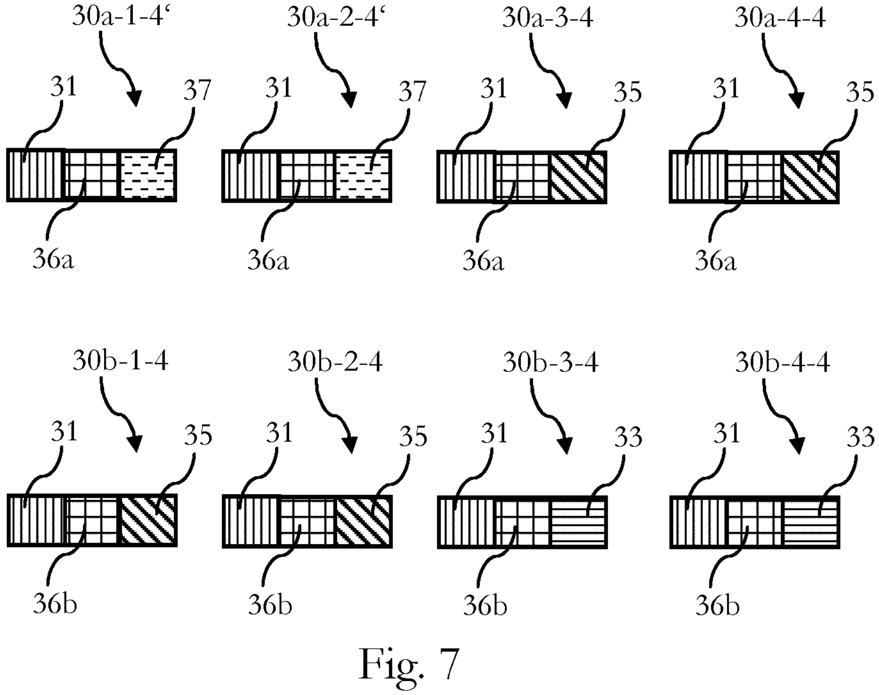
Fig. 7

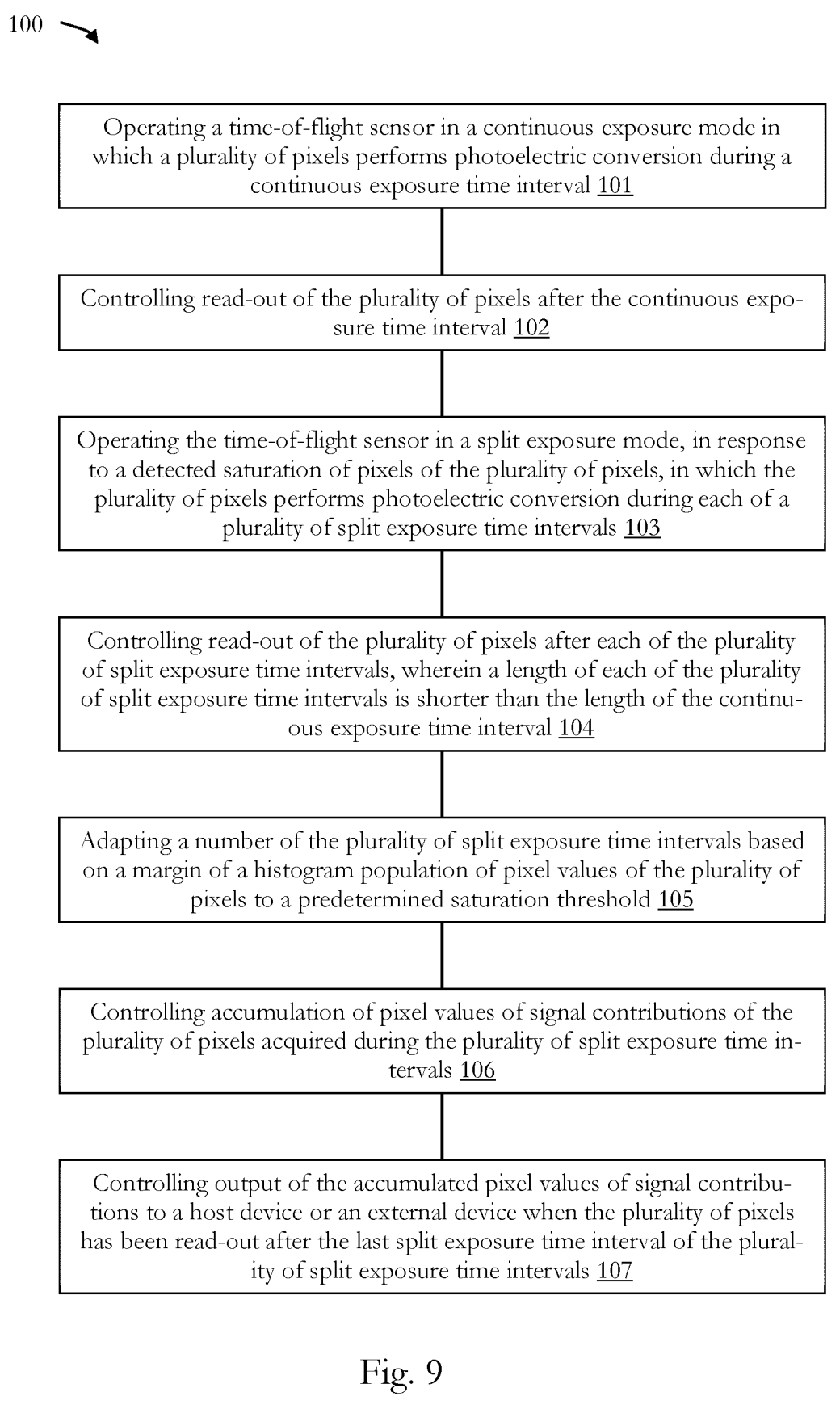

100

Operating a time-of-flight sensor in a continuous exposure mode in which a plurality of pixels performs photoelectric conversion during a continuous exposure time interval 101

Controlling read-out of the plurality of pixels after the continuous exposure time interval 102

Operating the time-of-flight sensor in a split exposure mode, in response to a detected saturation of pixels of the plurality of pixels, in which the plurality of pixels performs photoelectric conversion during each of a plurality of split exposure time intervals 103

Controlling read-out of the plurality of pixels after each of the plurality of split exposure time intervals, wherein a length of each of the plurality of split exposure time intervals is shorter than the length of the continuous exposure time interval 104

Adapting a number of the plurality of split exposure time intervals based on a margin of a histogram population of pixel values of the plurality of pixels to a predetermined saturation threshold 105

Controlling accumulation of pixel values of signal contributions of the plurality of pixels acquired during the plurality of split exposure time intervals 106

Controlling output of the accumulated pixel values of signal contributions to a host device or an external device when the plurality of pixels has been read-out after the last split exposure time interval of the plurality of split exposure time intervals 107

Fig. 9

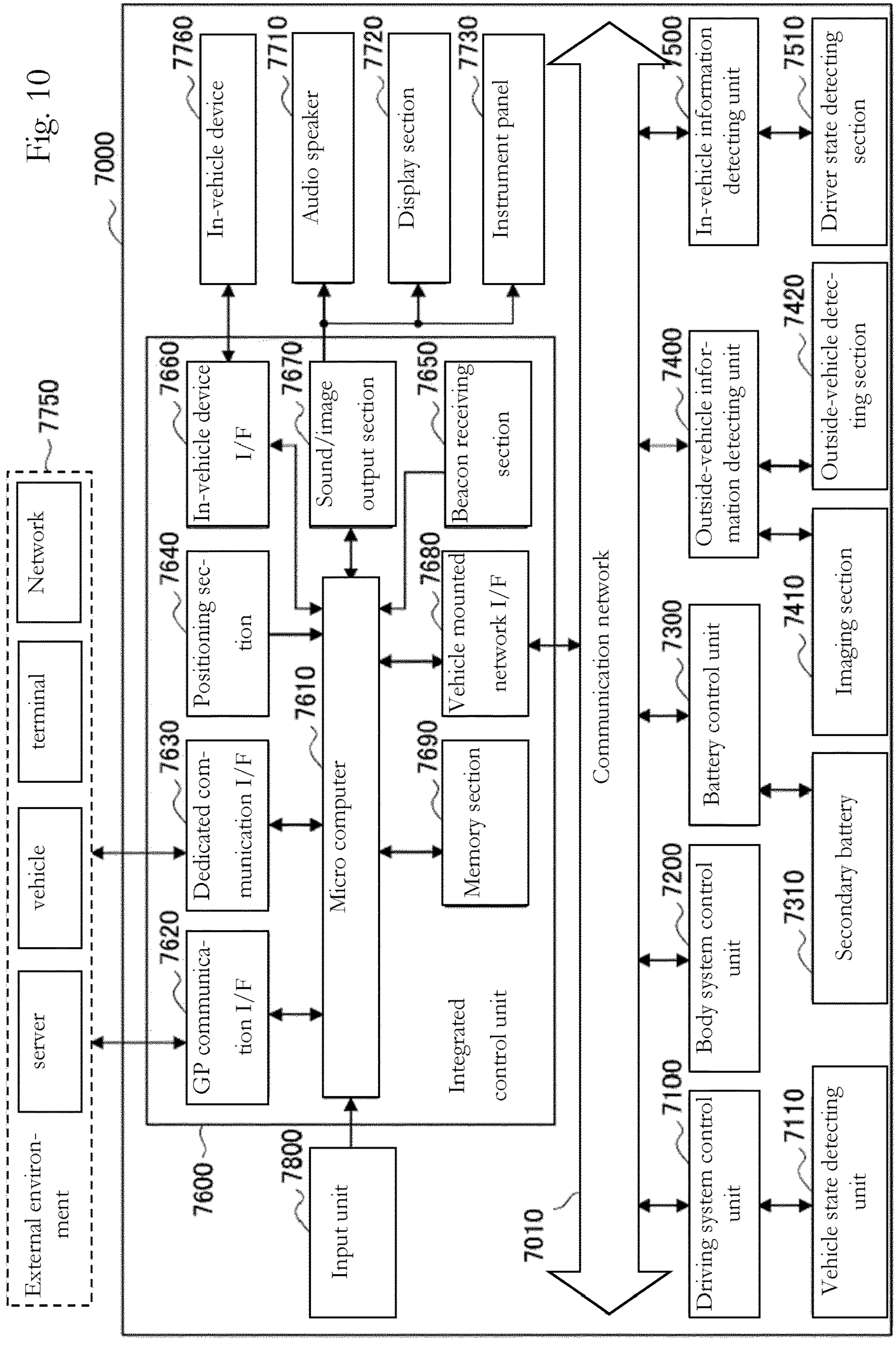
Fig. 10
7000
7750
External environment
server
vehicle
terminal
Network
7800
Input unit
7600
Integrated control unit
7610
Micro computer
7620
GP communication I/F
7630
Dedicated communication I/F
7640
Positioning section
7660
In-vehicle device I/F
7670
Sound/image output section
7650
Beacon receiving section
7680
Vehicle mounted network I/F
7690
Memory section
7760
In-vehicle device
7710
Audio speaker
7720
Display section
7730
Instrument panel
7010
Communication network
7100
Driving system control unit
7110
Vehicle state detecting unit
7200
Body system control unit
7300
Battery control unit
7310
Secondary battery
7400
Outside-vehicle information detecting unit
7410
Imaging section
7420
Outside-vehicle detecting section
7500
In-vehicle information detecting unit
7510
Driver state detecting section

SENSOR EXPOSURE MODE CONTROL AND SENSOR EXPOSURE MODE CONTROL METHOD

CROSS-REFERENCE TO RELATED APPLICATIONS

The present application is based on PCT/EP2022/083669, filed Nov. 29, 2022, which claims priority from European Patent Application No. 21212534.8, filed Dec. 6, 2021, the entire contents of each are incorporated herein by reference.

TECHNICAL FIELD

The present disclosure generally pertains to a control and a control method for a time-of-flight sensor.

TECHNICAL BACKGROUND

Generally, time-of-flight (ToF) systems are known, which are used for determining a distance to objects in a scene or a depth map of (the objects in) the scene that is illuminated with light. Typically, ToF systems include an illumination device (e.g. an array of light emitting diodes (LED)), optical parts (e.g. lenses), a ToF sensor such as an image sensor (e.g. array of current assisted photonic demodulator (CAPD) pixels) with read-out circuitry and a control.

For capturing a depth image, the ToF system typically illuminates the scene with, for instance, a modulated light wave and images the backscattered/reflected light wave on the ToF sensor. A gain of the pixels of the ToF sensor, for example, is modulated according to a demodulation signal which may be phase-shifted with respect to the modulation of the emitted light wave for generating ToF data indicative for the distance to the objects in the scene.

However, ambient light is captured by the pixels as well during the exposure time interval in which photoelectric conversion is performed such that, when the amount of ambient light increases, a remaining budget—before reaching a saturation of the pixels—for acquiring a signal contribution is reduced, thereby reducing the budget for depth sensing.

Although there exist techniques for controlling a time-of-flight sensor, it is generally desirable to improve the existing techniques.

SUMMARY

According to a first aspect the disclosure provides a control for a time-of-flight sensor, the time-of-flight sensor including a plurality of pixels configured to perform photoelectric conversion, the control comprising circuitry configured to:

- operate the time-of-flight sensor in a continuous exposure mode in which the plurality of pixels performs photoelectric conversion during a continuous exposure time interval and control read-out of the plurality of pixels after the continuous exposure time interval; and
- operate the time-of-flight sensor in a split exposure mode, in response to a detected saturation of pixels of the plurality of pixels, in which the plurality of pixels performs photoelectric conversion during each of a plurality of split exposure time intervals and control read-out of the plurality of pixels after each of the plurality of split exposure time intervals, wherein a length of each of the plurality of split exposure time intervals is shorter than the length of the continuous exposure time interval.

According to a second aspect the disclosure provides a control method for a time-of-flight sensor, the time-of-flight sensor including a plurality of pixels configured to perform photoelectric conversion, the control method comprising:

- operating the time-of-flight sensor in a continuous exposure mode in which the plurality of pixels performs photoelectric conversion during a continuous exposure time interval and controlling read-out of the plurality of pixels after the continuous exposure time interval; and
- operating the time-of-flight sensor in a split exposure mode, in response to a detected saturation of pixels of the plurality of pixels, in which the plurality of pixels performs photoelectric conversion during each of a plurality of split exposure time intervals and controlling read-out of the plurality of pixels after each of the plurality of split exposure time intervals, wherein a length of each of the plurality of split exposure time intervals is shorter than the length of the continuous exposure time interval.

Further aspects are set forth in the dependent claims, the following description and the drawings.

BRIEF DESCRIPTION OF THE DRAWINGS

Embodiments are explained by way of example with respect to the accompanying drawings, in which:

FIG. 5 schematically illustrates a second embodiment of a histogram population of pixel values of a plurality of pixels;

FIG. 6 schematically illustrates in a block diagram in FIG. 6A a first embodiment of acquisition processes and in FIG. 6B a second embodiment of acquisition processes;

FIG. 7 schematically illustrates in a block diagram in FIG. 7A a third embodiment of acquisition processes and in FIG. 7B a fourth embodiment of acquisition processes;

FIG. 9 schematically illustrates in a flow diagram a second embodiment of a control method;

FIG. 10 schematically illustrates in a block diagram an embodiment of a schematic configuration of a vehicle control system.

DETAILED DESCRIPTION OF EMBODIMENTS

Figure 2:
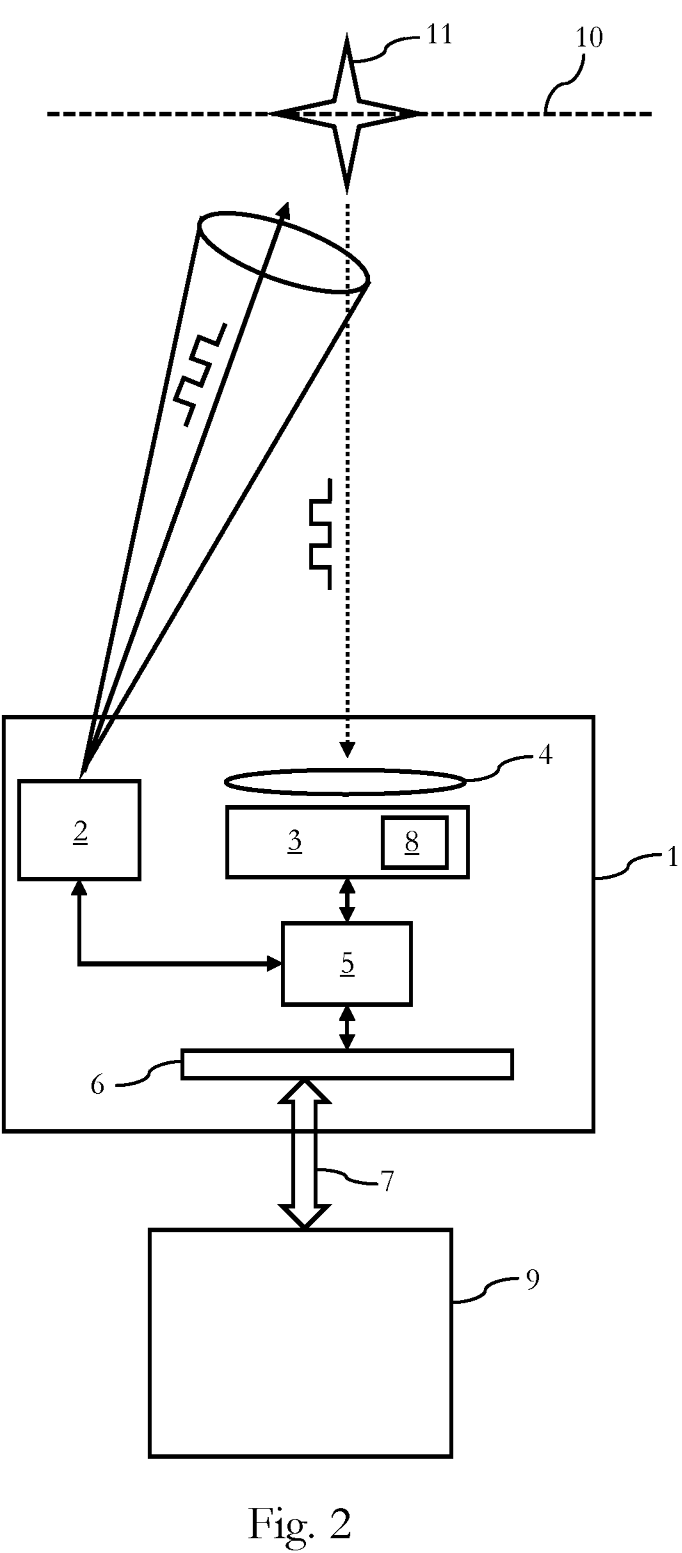
FIG. 2 schematically illustrates in a block diagram an embodiment of a time-of-flight system.

Before a detailed description of the embodiments under reference of FIG. 2 is given, general explanations are made.

As mentioned in the outset, generally, time-of-flight (ToF) systems are known, for example, indirect ToF systems in which, for instance, an illumination device emits a modulated light wave to a scene and a lens portion images the backscattered/reflected light on a ToF sensor. In some embodiments, a gain of a plurality of pixels (e.g., an array of two-tapped CAPD ("current assisted photonic demodulator") pixels) of the ToF sensor is modulated according to a demodulation signal which may be phase-shifted with respect to the modulation of the emitted modulated light wave for acquiring signal contributions indicative for the distance to the objects in the scene.

However, ambient light is captured by the pixels as well during the exposure time interval in which photoelectric conversion is performed such that, when the amount of ambient light increases, a remaining budget—before reaching a saturation of the pixels—for acquiring a signal contribution is reduced, thereby reducing the budget for depth sensing.

For enhancing the general understanding of the present disclosure an embodiment of a light modulation signal (LMS), a received light signal (RLS) and integrated voltages (IV) of a two-tapped pixel is discussed in the following under reference of FIG. 1, which schematically illustrates the embodiment and also applies to other embodiments of the present disclosure.

The upper graph schematically illustrates a light modulation signal (LMS) with which a light source of an illumination device of a ToF system (e.g., the ToF system 1 of FIG. 2) is modulated such that the light source emits light to a scene (illuminates the scene) modulated in time according to the LMS. The upper graph schematically illustrates only two modulation periods T1 and T2 for the sake of illustration and simplicity only.

An object in the scene reflects and scatters at least part of the modulated illumination light back to the ToF system which receives it and a lens portion of the ToF system images the received light signal (RLS) onto a ToF sensor of the ToF system. The middle graph schematically illustrates the RLS which also includes an ambient light (AL) part.

The ToF sensor includes a plurality of pixels, here CAPD pixels, and read-out circuitry, wherein each pixel has two taps: Tap A and Tap B.

The read-out circuitry applies a demodulation signal to Tap A and to Tap B, wherein the demodulation signal applied to Tap A is phase-shifted by 180° with respect to the demodulation signal applied to Tap B. A phase-shift between the LMS and the demodulation signal applied to Tap A is 0°.

The lower graph schematically illustrates the integrated voltages (IV) at Tap A and Tap B (or at a capacitance connected with Tap A or Tap B respectively) during the modulation periods.

In the modulation period T1, the voltage of Tap A (dashed line) changes during sub-period T1-1 due to photoelectric conversion of light corresponding to a part A1 of the RLS.

Further, in the modulation period T1, the voltage of Tap B (dashed dotted line) changes during sub-period T1-2 due to photoelectric conversion of light corresponding to a part B1 of the RLS.

In the modulation period T2, the voltage of Tap A further changes during sub-period T2-1 due to photoelectric conversion of light corresponding to a part A2 of the RLS.

Further, in the modulation period T2, the voltage of Tap B further changes during sub-period T2-2 due to photoelectric conversion of light corresponding to a part B2 of the RLS.

A signal contribution (SC) acquired by the pixel is given by the difference between the IV of Tap A and Tap B. The SC corresponds to the voltage change caused by the modulation light (ML) part of the RLS which thus includes distance information.

As mentioned above, the RLS includes the AL part which leads to a change of the voltage as well. The difference between Tap A and Tap B cancels this contribution in the SC out, however, each pixel (and each tap) has a finite capacitance and may thus saturate.

For example, in a further modulation period T3 (not shown), the voltage of Tap A may reach a predetermined saturation threshold.

Typically, ToF sensors are operated with a fixed/predetermined exposure time interval (the time interval between reset and read-out of the pixel in which photoelectric conversion is performed). For example, a plurality of such modulation periods T1, T2 and T3 after reset and before read-out of the pixel corresponds to an exposure time interval.

It has been recognized that the AL part—in particular when the AL part is large compared to the ML part—a remaining budget for acquiring the SC may be limited and, thus, the AL part acquired by both taps (Tap A, Tap B) may reduce the dynamic range of the ToF sensor.

It has thus been recognized that, even if the ambient light is removed when Tap A-Tap B is determined, in some embodiments, the budget before reaching the predetermined saturation threshold is reduced by the ambient light condition which can result in a very limited budget to even no budget for depth sensing (e.g., for high ambient light).

In some cases, as generally known, some ToF sensors or ToF Systems may not show stable performances for all ambient light conditions.

It has been recognized that the dynamic range of the ToF sensor depends on the AL part and that a saturation of pixels is related to a length of the exposure time interval, since the AL part is acquired as well.

Thus, it has been recognized that the exposure time interval should be replaced by a plurality of shorter exposure time intervals when pixel saturation is detected for increasing a dynamic range of the ToF sensor. This may allow a robust ToF data acquisition, in some instances even under challenging ambient light conditions. This may thus also allow to increase a sunlight robustness which could be useful in various use cases, for example, in automotive applications.

Hence, some embodiments pertain to a (sensor exposure mode) control for a time-of-flight sensor, wherein the time-of-flight sensor includes a plurality of pixels configured to perform photoelectric conversion, wherein the control includes circuitry configured to:

- operate the time-of-flight sensor in a continuous exposure mode in which the plurality of pixels performs photoelectric conversion during a continuous exposure time interval and control read-out of the plurality of pixels after the continuous exposure time interval; and
- operate the time-of-flight sensor in a split exposure mode, in response to a detected saturation of pixels of the plurality of pixels, in which the plurality of pixels performs photoelectric conversion during each of a plurality of split exposure time intervals and control read-out of the plurality of pixels after each of the plurality of split exposure time intervals, wherein a length of each of the plurality of split exposure time intervals is shorter than the length of the continuous exposure time interval.

The ToF sensor may be an image sensor including a plurality of pixels (e.g., arranged in an array in rows and columns) and read-out circuitry (e.g., including driving units, analog-to-digital converters etc., as generally known).

For example, the read-out circuitry may apply a demodulation signal to the plurality of pixels and may output the demodulation signal.

The plurality of pixels may be current-assisted photonic demodulator (CAPD) pixels, single photon avalanche diode (SPAD) pixels or the like. The plurality of pixels may be one-tapped pixels, two-tapped pixels, three-tapped pixels, four-tapped pixels etc., as generally known.

Each pixel of the plurality of pixels is configured to perform photoelectric conversion for generating an electric signal (e.g., a voltage) in accordance with an amount of light incident onto the respective pixel. The electric signal may be converted to a pixel value of the respective pixel by analog-to-digital conversion. The pixel value may include a pixel value of each tap. The pixel value may be a difference between the pixel values of each tap, i.e. the pixel value of the signal contribution.

The plurality of pixel values may represent ToF data or may be used to determine ToF data, as generally known, wherein the ToF data is indicative for a distance (distances) to an object (objects) in a scene.

The ToF sensor may include an on-chip buffer for storing and accumulating pixel values of the plurality of pixels.

The control may control the overall operation of the ToF sensor (and of a ToF system). The control may receive the demodulation signal and may output a light modulation signal in accordance with the demodulation signal for generating phase-shifts between both signals for performing an indirect ToF (iToF) measurement, as generally known.

The circuitry may be based on or may include or may be implemented as integrated circuitry logic or may be implemented by one or more CPUs (central processing unit), one or more application processors, one or more graphical processing units (GPU), a microcontroller, an FPGA (field programmable gate array), an ASIC (application specific integrated circuit) or the like. The functionality may be implemented by software executed by a processor such as an application processor or the like.

The circuitry may be based on or may include or may be implemented by typical electronic components configured to achieve the functionality as described herein. The circuitry may be based on or may include or may be implemented in parts by typical electronic components and integrated circuitry logic and in parts by software.

The circuitry may include a data bus interface for transmitting (and receiving) data over a data bus.

The data bus interface may be a Camera Serial Interface (CSI) in accordance with MIPI (Mobile Industry Processor Interface) specifications (e.g. MIPII CSI-2 or the like), an I2C (Inter-Integrated Circuit) interface, a Controller Area Network (CAN) bus interface, an FDP-link (Flat Panel Display link), a GSML (Gigabit Multimedia Serial Link), etc. The data bus is in accordance with the corresponding interface specifications.

The circuitry may include a communication interface configured to communicate and exchange data with a computer or processor (e.g. an application processor) over a network (e.g. the internet) via a wired or a wireless connection such as a mobile telecommunications system which may be based on UMTS, LTE or the like (and implements corresponding communication protocols).

The circuitry may include data storage capabilities to store data such as memory which may be based on semiconductor storage technology (e.g. RAM, EPROM, etc.) or magnetic storage technology (e.g. a hard disk drive) or the like.

The circuitry of the control is configured to operate the ToF sensor in a continuous exposure mode in which the plurality of pixels performs photoelectric conversion during a continuous exposure time interval and to control read-out of the plurality of pixels after the continuous exposure time interval.

Generally, an exposure time interval corresponds to the time interval between a reset of the plurality of pixels and a read-out of the plurality of pixels during which photoelectric conversion is performed by the plurality of pixels.

The circuitry of the control is configured to operate the ToF sensor in a split exposure mode, in response to a detected saturation of pixels of the plurality of pixels, in which the plurality of pixels performs photoelectric conversion during each of a plurality of split exposure time intervals and control read-out of the plurality of pixels after each of the plurality of split exposure time intervals, wherein a length of each of the plurality of split exposure time intervals is shorter than the length of the continuous exposure time interval.

Hence, the control operates the ToF sensor in a continuous exposure mode (which may also be referred to as normal mode or standard mode) and switches to the split exposure mode when a saturation of pixels is detected.

Generally, the amount of ambient light (ambient light part) may reduce a dynamic range of the ToF sensor and thus a remaining budget for depth sensing. For example, when pixels saturate, the modulation light part of the received light signal may not be acquired completely.

Thus, the continuous exposure time interval associated with a ToF measurement (for example, a specific phase-shift between light modulation signal and demodulation signal in iToF) is replaced by a plurality of shorter split exposure time intervals for avoiding pixel saturation and for increasing the dynamic range of the ToF sensor.

In some embodiments, a sum of the lengths of the plurality of split exposure time intervals is equal to the continuous exposure time interval.

In some embodiments, each split exposure time interval of the plurality of split exposure time intervals has the same length.

In some embodiments, the saturation of the pixels of the plurality of pixels is detected based on an analysis of a histogram population of pixel values of the plurality of pixels.

In some embodiments, the circuitry is further configured to detect the saturation of the pixels of the plurality of pixels.

After read-out of the plurality of pixels, in some embodiments, the pixel value (e.g., including a pixel value of each tap or a pixel value of the signal contribution) of each pixel is collected in a histogram bin corresponding to a pixel value range/interval for generating the histogram population. The histogram population may be generated over more than one read-outs of the plurality of pixels. In some embodiments, the circuitry is further configured to generate the histogram population of pixel values of the plurality of pixels.

The analysis of the histogram population may include determining a number of saturated pixels and whether the number of saturated pixels is above a predetermined threshold (e.g., 5% or 10% of the plurality of pixels without limiting the present disclosure in this regard). The number of saturated pixels may correspond to the number of pixel values which are binned in a pixel value interval that is above the predetermined saturation threshold. The number of saturated pixels may correspond to the number of pixel values which are binned in a pixel value interval that is directly below the predetermined saturation threshold.

In some embodiments, the circuitry is further configured to determine the smallest number of the plurality of split exposure time intervals such that saturation of pixels is avoided. The smallest number of the plurality of split exposure time intervals may be determined iteratively or based on histogram population patterns or the like.

In some embodiments, the circuitry is further configured to control a number of the plurality of split exposure time intervals based on a number of saturated pixels.

For example, when 25% of the pixels are saturated, the number of the plurality of split exposure time intervals may be two. For example, when 50% of the pixels are saturated, the number of the plurality of split exposure time intervals may be four.

The control may dynamically adapt the number of the plurality of split exposure time intervals for increasing a dynamic range of the ToF sensor and sunlight robustness.

In some embodiments, the circuitry is further configured to adapt a number of the plurality of split exposure time intervals based on a margin of a histogram population of pixel values of the plurality of pixels to a predetermined saturation threshold.

Thus, in some embodiments, a dynamical adaption of the number (and/or length in some embodiments) of the plurality of split exposure time intervals based on the ambient light conditions is achieved for increasing the dynamic range of the ToF sensor and the robustness of the ToF system.

In some embodiments, the circuitry is further configured to control accumulation of pixel values of signal contributions of the plurality of pixels acquired during the plurality of split exposure time intervals.

In some embodiments, the pixel values of signals contributions are accumulated in an on-chip buffer of the ToF sensor for output to a host device or an external device.

In some embodiments, the circuitry is further configured to control output of the accumulated pixel values of signal contributions to a host device or an external device when the plurality of pixels has been read-out after the last split exposure time interval of the plurality of split exposure time intervals.

The host device may be, for example, a mobile device such as a smartphone, a virtual reality glass or the like including an application processor or the like. The external device may be, for example, a board computer of a vehicle, a server of a factory or the like.

Thus, in some embodiments, due to accumulation in an on-chip buffer, a dynamic range of the ToF sensor may be increased without increasing a bandwidth requirement (of the data bus interface) for data transmissions between the ToF sensor and the host device or the external device.

In some embodiments, the circuitry is further configured to adapt a number of the plurality of split exposure time intervals based on a margin of a histogram population of accumulated pixel values of signal contributions of the plurality of pixels to a predetermined saturation threshold.

Thus, in some embodiments, a dynamical adaption of the number (and/or length in some embodiments) of the plurality of split exposure time intervals based on the ambient light conditions is achieved for increasing the dynamic range of the ToF sensor.

It has been recognized that the overall time required to perform a ToF measurement (acquisition process) may increase due to the plurality of split exposure time intervals instead of having a single longer continuous exposure time interval.

The acquisition process may be referred to as a frame in some embodiments. The acquisition process associated a split exposure time interval may be referred to as a micro-frame in some embodiments. Thus, in some embodiments, the control dynamically switches to micro-framing and adapts the micro-frames dynamically.

It has been further recognized that, however, some depth sensing applications may have to process the ToF data faster than the ToF data can be delivered when the pixel values of signal contributions acquired during all of the plurality of split exposure time intervals are accumulated.

Hence, it has been recognized that a first subset of data should be output before all of the plurality of split exposure time intervals are processed for increasing a robustness of the ToF sensing and the depth sensing applications.

Thus, in some embodiments, the circuitry is further configured to control accumulation of pixel values of signal contributions acquired during a subset of subsequent split exposure time intervals of the plurality of split exposure time intervals, wherein the subset of subsequent split exposure time intervals includes the first split exposure time interval of the plurality of split exposure time intervals.

In some embodiments, the circuitry is further configured to control output of the accumulated pixel values of signal contributions (acquired during the subset of subsequent split exposure time intervals of the plurality of split exposure time intervals) to a host device or an external device once the plurality of pixels has been read-out after the last split exposure time interval of the subset of subsequent split exposure time intervals.

In some embodiments, the circuitry is further configured to control output of pixel values of signal contributions acquired during a split exposure time interval to a host device or an external device once the plurality of pixels has been read-out after the respective split exposure time interval.

Some embodiments pertain to a (sensor exposure mode) control method for a time-of-flight sensor, wherein the time-of-flight sensor includes a plurality of pixels configured to perform photoelectric conversion, wherein the control method includes:

- operating the time-of-flight sensor in a continuous exposure mode in which the plurality of pixels performs photoelectric conversion during a continuous exposure time interval and controlling read-out of the plurality of pixels after the continuous exposure time interval; and
- operating the time-of-flight sensor in a split exposure mode, in response to a detected saturation of pixels of the plurality of pixels, in which the plurality of pixels performs photoelectric conversion during each of a plurality of split exposure time intervals and controlling read-out of the plurality of pixels after each of the plurality of split exposure time intervals, wherein a length of each of the plurality of split exposure time intervals is shorter than the length of the continuous exposure time interval.

The control method may be performed by the control as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

At least one of the following may be provided or achieved by the control and the control method for a ToF sensor as described herein:

An adaptive (micro-) frame accumulation for increased dynamic range and sunlight robustness for iToF systems in some embodiments.

A ToF sensor and a ToF sensor acquisition method, in some embodiments, configured to build an acquisition histogram (on-chip) in an adaptive fashion, configured to perform micro-framing acquisitions (either on host or on-chip) to increase the dynamic range of the ToF sensor, configured to perform adaptive micro-framing acquisitions (either on host or on-chip) and/or robust ToF acquisition (in high/challenging ambient light conditions).

The micro-framing acquisitions may allow to increase the dynamic range of the ToF sensor.

Multiple ToF acquisitions may be accumulated either on host or on chip in some embodiments.

The minimum number of split exposure time intervals and thus accumulations is determined in some embodiments.

Switching between continuous exposure and split exposure mode when ambient light is detected which saturates pixels in some embodiments, wherein the number of steps is determined based on the number of saturated pixels.

Monitoring of how close the histogram population is close to saturation in some embodiments, when there is margin regarding the predetermined saturation threshold, the number of steps is reduced.

The dynamic range may be increased without increasing the bandwidth requirements between ToF sensor and host or external device.

A stable performance independently of the ambient light condition (better from a system perspective—especially for automotive) may be achieved.

When micro-framing is done on-chip (with micro-frame buffer on-chip), the chip may mask the complexity of the micro-framed acquisition to the host.

At least one of the following use cases may be provided by the control and the control method for a ToF sensor as described herein:

For example, some use cases relate to use cases in which the quality of the 3D image is expected or required to be stable and not changing if the external conditions change.

A broad field of use may be safety related applications.

Two fields of application may have strict requirements regarding safety: Automotive and Factory automation.

For instance:

(Automotive) driver/passenger/kids monitoring, face ID application, (Factory) object detection, measurements, obstacles avoidance.

The depth information may be used as the main information or as a complementary information to an RGB/IR ("red-green-blue/infrared") acquisition. The ToF sensor may integrate also the IR sensing, and in this case the ToF stream may complement the IR information generated by the sensor itself.

Returning to FIG. 2, there is schematically illustrated an embodiment of a ToF system 1, which is discussed in the following under reference of FIG. 1, FIG. 2, FIG. 3, FIG. 4, FIG. 5, FIG. 6 and FIG. 7.

The ToF system 1 is an indirect ToF system (iToF system) and is embedded in a vehicle.

The ToF system 1 includes an illumination device 2, a ToF sensor 3, a lens portion 4, a control 5, a communication interface 6 and a data bus interface 7. The ToF sensor 3 includes an on-chip buffer 8 for temporarily storing and accumulating pixel values of the plurality of pixels. The vehicle includes a board computer 9 which can communicate and exchange data with the ToF system 1 via the data bus interface 7.

The illumination device 2 includes a light source (e.g., an LED array or laser diode array).

The ToF sensor 3 includes a plurality of pixels (not shown), which are two-tapped CAPD pixels.

The illumination device 2 illuminates a scene 10 with light modulated in accordance with a light modulation signal (LMS in FIG. 1) from the control 5.

Figure 1:
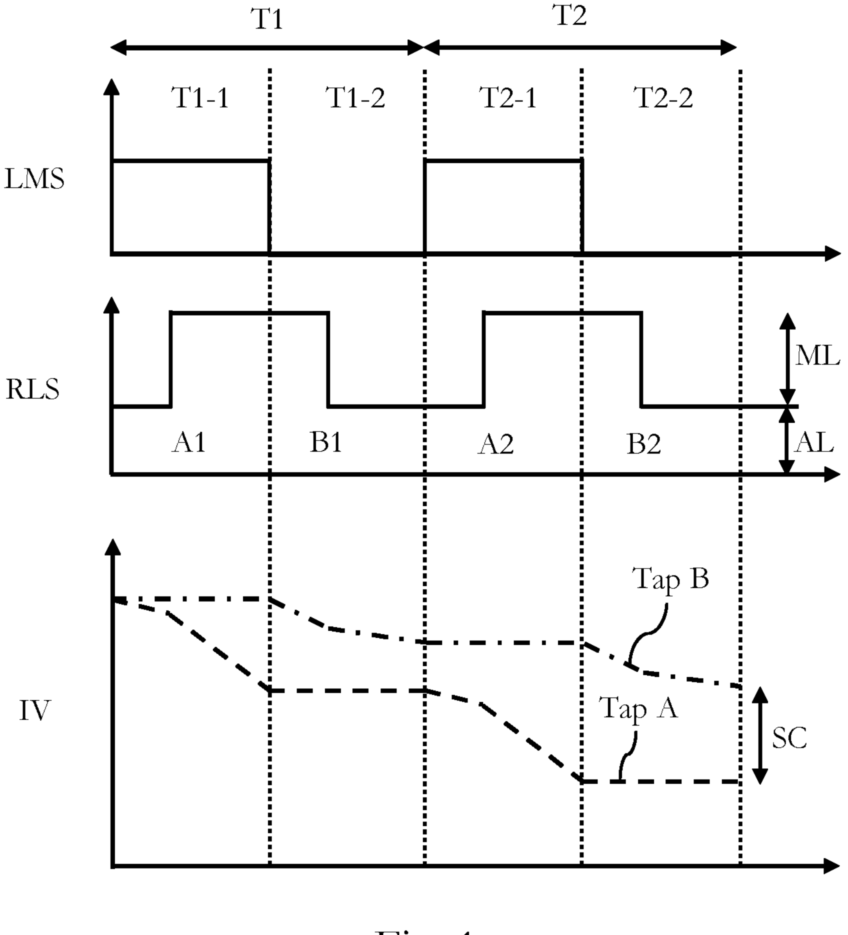
FIG. 1 schematically illustrates an embodiment of a light modulation signal, a received light signal and integrated voltages of a two-tapped pixel.

An object 11 in the scene 10 reflects at least a part of the illumination light towards the ToF system 1 which the lens portion 4 gathers and images onto the ToF sensor 3 (received light signal (RLS in FIG. 1).

The control 5 basically controls the overall operation of the ToF system 1 and controls the ToF system 1 such that two ToF measurements (two acquisition processes) are repeatedly performed for obtaining depth information about the object 11 in the scene 10.

In the first ToF measurement (first acquisition process), the control 5 sets a phase-shift of 0° between the LMS and the demodulation signal applied to Tap A (the phase-shift between the demodulation signals of Tap A and Tap B is) 180°.

In the second ToF measurement (second acquisition process), the control 5 sets a phase-shift of 180° between the LMS and the demodulation signal applied to Tap A (the phase-shift between the demodulation signals of Tap A and Tap B is 180°).

Initially, the control 5 operates the ToF sensor 3 in a continuous exposure mode in which the plurality of pixels performs photoelectric conversion during a continuous exposure time interval and controls read-out of the plurality of pixels after the continuous exposure time interval.

The control 5 obtains the pixel values (a pixel value for each of the two taps (Tap A and Tap B)) of the plurality of pixels for further processing.

Figure 3:
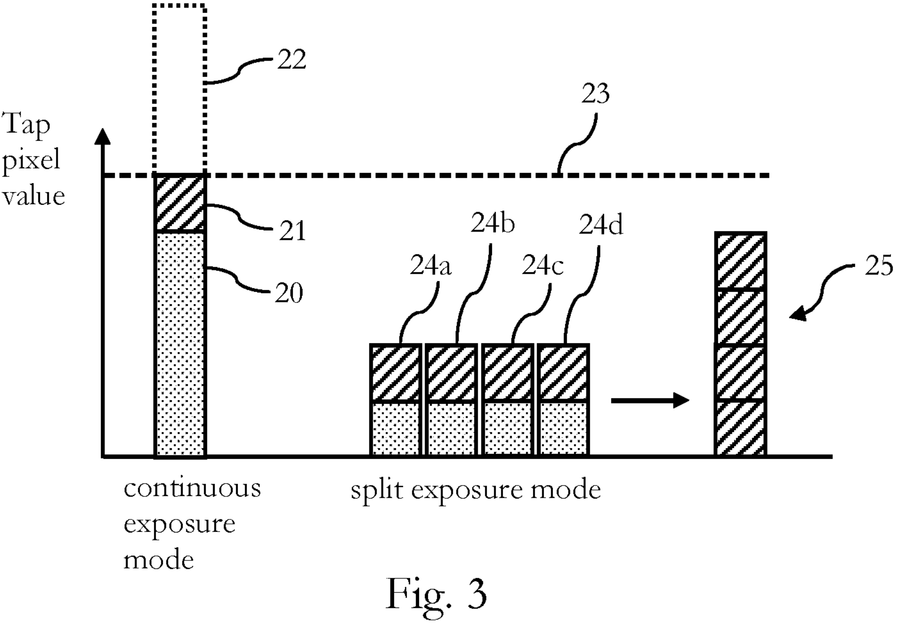
FIG. 3 schematically illustrates an embodiment of pixel values.

Referring to FIG. 3, there is schematically illustrated an embodiment of pixel values, which is discussed in the following.

On the left, a pixel value of a tap of a pixel is schematically illustrated as a bar. The pixel value is acquired in the continuous exposure mode.

The pixel value includes a first pixel value 20 of an ambient light contribution (dotted area) and a second pixel value 21 of a signal contribution (dashed area) acquired during the continuous exposure time interval.

However, the second pixel value 21 would have been higher as indicated by the box 22 when the pixel value would have not reached a predetermined saturation threshold 23.

Hence, due to the ambient light contribution the dynamic range of the ToF sensor 3 is reduced.

Returning to FIG. 2, for detecting whether pixels are saturated, the control 5 generates a histogram population of the pixel values of the plurality of pixels.

Figure 4:
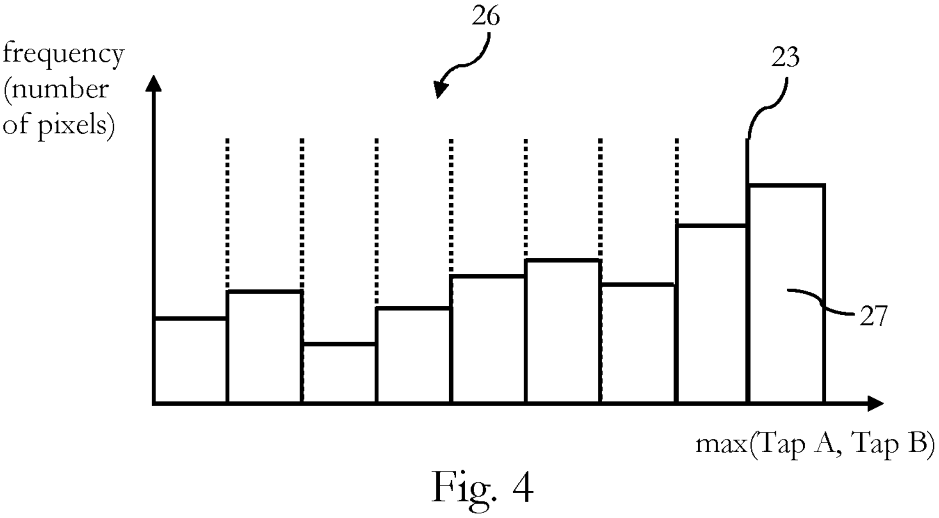
FIG. 4 schematically illustrates a first embodiment of a histogram population of pixel values of a plurality of pixels.

Referring to FIG. 4, which schematically illustrates a first embodiment of a histogram population 26 of pixel values of the plurality of pixels, which is discussed in the following.

The histogram population 26 of pixel values of the plurality of pixels is generated in the continuous exposure mode. The pixel values (e.g., the pixel value in the continuous exposure mode of FIG. 3) are collected in histogram bins corresponding to pixel value ranges/intervals based on the maximum of the tap pixel values.

The pixels for which the pixel values correspond to a saturation of the pixel, i.e. the pixel value has reached the saturation threshold 23, are collected in a histogram bin corresponding to saturation pixel value interval 27 depicted in FIG. 4 on the right of the saturation threshold 23.

The control 5 detects saturation of pixels of the plurality of pixels based on an analysis of the histogram population 26. For example, the control 5 determines that a number of saturated pixels (the number of pixels summed in the saturation pixel value interval) is above a predetermined threshold.

In response to the detection of saturation of pixels, the control 5 operates the ToF sensor 3 in the split exposure mode in which the plurality of pixels performs photoelectric conversion during each of a plurality of split exposure time intervals and controls read-out of the plurality of pixels after each of the plurality of split exposure time intervals, wherein a length of each of the plurality of split exposure time intervals is shorter than the length of the continuous exposure time interval.

In this embodiment, a sum of the lengths of the plurality of split exposure time intervals is equal to the continuous exposure time interval.

Moreover, in this embodiment, each split exposure time interval of the plurality of split exposure time intervals has the same length.

The control 5 determines the number of the plurality of split exposure time intervals based on the number of saturated pixels.

Referring again to FIG. 3, in the middle, the four pixel values 24*a-d* of a tap of a pixel are schematically illustrated as a bar. The pixel values 24*a-d* are acquired in the split exposure mode.

The number of the plurality of split exposure time intervals is—for the sake of illustration only—four and the length of each split exposure time interval is the length of the continuous exposure time interval divided by four (the number of the plurality of saturation exposure time intervals).

Each of the pixel values 24*a-d* includes a first pixel value of an ambient light contribution (dotted area) and a second pixel value of a signal contribution (dashed area) acquired during the respective split exposure time interval.

Due to the shorter exposure time interval in the split exposure mode, the ambient light contribution is reduced. However, as the pixel does not saturate anymore, the full signal contribution indicated by the box 22 on the left is acquired during the plurality of split exposure time intervals.

Each pixel value of the pixel values 24*a-d* contributes equally, as indicated by an accumulated pixel value of signal contributions 25 shown on the right. The accumulated pixel value of signal contributions 25 is obtained by summing up the second pixel value of the signal contribution of the pixel values 24*a-d*.

Hence, due to the switching to the split exposure mode the dynamic range of the ToF sensor 3 is increased.

Returning to FIG. 2, for detecting whether pixels are still saturated, the control 5 generates a histogram population of the pixel values of the plurality of pixels.

Referring to FIG. 5, which schematically illustrates a second embodiment of a histogram population 28 of pixel values of the plurality of pixels, which is discussed in the following.

The histogram population 28 of pixel values of the plurality of pixels is generated in the split exposure mode. The pixel values (e.g., the pixel values 24*a-d* in the split exposure mode or the accumulated pixel value of the signal contributions 25 of FIG. 3) are collected in histogram bins corresponding to pixel value ranges/intervals based on the maximum of the tap pixel values.

The control 5 monitors the histogram population 28 for detecting whether the number (and/or the length) of the plurality of split exposure time intervals can be reduced or should be increased.

For example, the control 5 monitors a margin 29 of the histogram population 28 of the pixel values of the plurality of pixels to the predetermined saturation threshold 23. The control 5 adapts the number of the plurality of split exposure time intervals based on the margin 29.

Thus, the control 5 provides a dynamic adaption of exposure time intervals based on ambient light conditions for increasing the dynamic range of the ToF sensor 3 and the ambient light robustness of the ToF system 1 or of a depth sensing application utilizing the ToF data.

Returning to FIG. 2, as mentioned further above, the control 5 controls the ToF system 1 such that two ToF measurements (two acquisition processes) are repeatedly performed for obtaining depth information about the object 11 in the scene 10.

In the following, embodiments of acquisition processes are discussed under reference of FIG. 6 and FIG. 7, which schematically illustrate in a block diagram in FIG. 6A a first embodiment of acquisition processes, in FIG. 6B a second embodiment of acquisition processes, in FIG. 7A a third embodiment of acquisition processes and in FIG. 7B a fourth embodiment of acquisition processes.

Referring to FIG. 6A, there is schematically illustrated a first acquisition process 30*a* and a subsequent second acquisition process 30*b*.

The control 5 performs the first acquisition process 30*a* and the second acquisition process 30*b* when the control 5 operates the ToF sensor 3 in the continuous exposure mode.

The first acquisition process 30*a* corresponds to a measurement with a phase-shift of 0° between the LMS (see FIG. 1) and the demodulation signal applied to Tap A (the phase-shift between the demodulation signals of Tap A and Tap B is) 180°.

The second acquisition process 30*b* corresponds to a measurement with a phase-shift of 180° between the LMS (see FIG. 1) and the demodulation signal applied to Tap A (the phase-shift between the demodulation signals of Tap A and Tap B is) 180°.

The first acquisition process 30*a* includes a reset time interval 31, a continuous exposure time interval 32*a* and a first read-out time-interval 33.

In the reset time interval 31 of acquisition process 30*a*, the control 5 controls resetting of the plurality of pixels, as generally known.

In the continuous exposure time interval 32*a* of acquisition process 30*a*, the control 5 controls setting of the phase-shift to 0° and the plurality of pixels performs photoelectric conversion.

In the first read-out time-interval 33 of acquisition process 30*a*, the control 5 controls read-out of the plurality of pixels and controls output of the pixel values to the board computer 9 via the communication interface 6 over the data bus interface 7.

The second acquisition process 30*b* includes the reset time interval 31, a continuous exposure time interval 32*b* and the first read-out time-interval 33.

In the continuous exposure time interval 32*b* of acquisition process 30*b*, the control 5 controls setting of the phase-shift to 180° and the plurality of pixels perform photoelectric conversion.

The control 5 sets the length of the continuous exposure time interval 32*a* and continuous exposure time interval 32*b* to the same value.

Then, for example, the control 5 performs the first acquisition process 30*a* again and then the second acquisition process 30*b* and so on.

Then, at some point, the control 5 detects a saturation of pixels of the plurality of pixels and switches to the split exposure mode.

Referring to FIG. 6B, a first acquisition process includes a first split exposure acquisition process 30*a*-1-2 and a subsequent second split exposure acquisition process 30*a*-2-2, and a second acquisition process includes a third split exposure acquisition process 30*b*-1-2 and a subsequent fourth split exposure acquisition process 30*b*-2-2.

The first split exposure acquisition process 30*a*-1-2 includes the reset time interval 31, a split exposure time interval 34*a* and a second read-out time interval 35.

The second split exposure acquisition process 30*a*-2-2 includes the reset time interval 31, the split exposure time interval 34*a* and the second read-out time interval 35.

In the split exposure time interval 34*a* of acquisition processes 30*a*-1-2 and 30*a*-2-2, the control 5 controls setting of the phase-shift to 0° and the plurality of pixels performs photoelectric conversion.

In the second read-out time interval 35 of acquisition processes 30*a*-1-2 and 30*a*-2-2, the control 5 controls read-out of the plurality of pixels and accumulation of pixel values of signal contributions of the plurality of pixels acquired during the split exposure time intervals 34*a*, wherein the pixel values of signals contributions are accumulated in the on-chip buffer 8 of the ToF sensor for output to the board computer 9.

Hence, after the second split exposure acquisition process 30*a*-2-2, the on-chip buffer 8 stores the accumulated pixel values of signals contributions acquired during the two split exposure time intervals 34*a* of acquisition processes 30*a*-1-2 and 30*a*-2-2.

The third split exposure acquisition process 30*b*-1-2 includes the reset time interval 31, a split exposure time interval 34*b* and the first read-out time interval 33.

The fourth split exposure acquisition process 30*b*-2-2 includes the reset time interval 31, the split exposure time interval 34*b* and the first read-out time interval 33.

In the split exposure time interval 34*b* of acquisition processes 30*b*-1-2 and 30*b*-2-2, the control 5 controls setting of the phase-shift to 180° and the plurality of pixels perform photoelectric conversion.

The control 5 sets the length of the split exposure time intervals 34*a* and 34*b* to half of the length of the continuous exposure time interval 32*a* and 32*b*, respectively.

For example (without limiting the disclosure in this regard): The length of the continuous exposure time intervals 32*a* and 32*b* may be 400 microseconds, however, about 25% of the pixels may be saturated such that the length of the split exposure time intervals 34*a* and 34*b* is determined to be 200 microseconds.

In the first read-out time interval 33 of acquisition processes 30*b*-1-2 and 30*b*-2-2, the control 5 controls output of pixel values of signal contributions acquired during a split exposure time interval 34*b* to the board computer 9 once the plurality of pixels has been read-out after the respective split exposure time interval 34*b*.

Moreover, in any of the first read-out time intervals 33 of acquisition processes 30*b*-1-2 and 30*b*-2-2, the control 5 controls read-out of the on-hip buffer 8 for output of the accumulated pixel values of signal contributions acquired during the two split exposure time intervals 34*a* of acquisition processes 30*a*-1-2 and 30*a*-2-2.

Hence, the dynamic range of the ToF sensor 3 is increased without increasing the bandwidth requirement of the data bus interface 7 (e.g., MIPI), since the data of the first acquisition process is output together with the data of the second acquisition process when on-chip accumulation is performed.

Referring to FIG. 7A, a first acquisition process includes a first split exposure acquisition process 30*a*-1-4, a second split exposure acquisition process 30*a*-2-4, a third split exposure acquisition process 30*a*-3-4 and a fourth split exposure acquisition process 30*a*-4-4, and a second acquisition process includes a fifth split exposure acquisition process 30*b*-1-4, a sixth split exposure acquisition process 30*b*-2-4, a seventh split exposure acquisition process 30*b*-3-4 and an eight split exposure acquisition process 30*b*-4-4.

Basically, this embodiment is similar to the embodiment discussed under reference of FIG. 6B, except for:

The control 5 sets the length of the split exposure time intervals 36*a* and 36*b* to the half of the length of the split exposure time intervals 34*a* and 34*b*, respectively, and thus to a quarter of the length of the continuous exposure time intervals 32*a* and 32*b*, respectively. Hence, the control 5 sets the number of split exposure time intervals 36*a* an 36*b* twice of 34*a* and 34*b* and four times of 32*a* and 32*b*, respectively.

For example (without limiting the disclosure in this regard): The length of the continuous exposure time intervals 32*a* and 32*b* may be 400 microseconds, however, about 50% of the pixels may be saturated such that the length of the split exposure time intervals 36*a* and 36*b* is determined to be 100 microseconds.

In the second read-out time interval 35 of split exposure acquisition processes 30*a*-1-4 to 30*a*-4-4, the control 5 controls read-out of the plurality of pixels and accumulation of pixel values of signal contributions of the plurality of pixels acquired during the split exposure time intervals 36*a*, wherein the pixel values of signals contributions are accumulated in the on-chip buffer 8 of the ToF sensor for output to the board computer 9.

Moreover, in the second read-out time interval 35 of split exposure acquisition processes 30*b*-1-4 and 30*b*-2-4, the control 5 controls read-out of the plurality of pixels and accumulation of pixel values of signal contributions of the plurality of pixels acquired during the split exposure time intervals 36*b*, wherein the pixel values of signals contributions are accumulated in the on-chip buffer 8 of the ToF sensor 3 for output to the board computer 9.

Hence, after the fourth split exposure acquisition process 30*a*-4-4, the on-chip buffer 8 stores the accumulated pixel values of signals contributions acquired during the four split exposure time intervals 36*a*.

Additionally, after the sixth split exposure acquisition process 30*b*-2-4, the on-chip buffer 8 stores the accumulated pixel values of signals contributions acquired during the first two split exposure time intervals 36*b*.

In the first read-out time interval 33 of split exposure acquisition processes 30*b*-3-4 and 30*b*-4-4, the control 5 controls output of pixel values of signal contributions acquired during a split exposure time interval 36*b* to the board computer 9 once the plurality of pixels has been read-out after the respective split exposure time interval 36*b*.

Moreover, in any of the first read-out time intervals 33 of split exposure acquisition processes 30*b*-3-4 and 30*b*-4-4, the control 5 controls read-out of the on-hip buffer 8 and output of the accumulated pixel values of signal contributions acquired during the four split exposure time intervals 36*a* and acquired during the two split exposure time intervals 36*b*.

Hence, the dynamic range of the ToF sensor 3 is increased without increasing the bandwidth requirement of the data bus interface 7 (e.g., MIPI), since the data of the first acquisition process is output together with the data of the second acquisition process when on-chip accumulation is performed.

In some embodiments, the control 5 controls accumulation of pixel values of signal contributions acquired during split exposure time intervals 30*a*-1-4 and 30*a*-2-4 into a first set, accumulation of pixel values of signal contributions acquired during split exposure time intervals 30*a*-3-4 and 30*a*-4-4 into a second set, and accumulation of pixel values of signal contributions acquired during split exposure time intervals 30*b*-1-4 and 30*b*-2-4 into a third set.

In such embodiments, the control 5 controls output of the first, second and third set in the first read-out time intervals 33 of split exposure acquisition processes 30*b*-3-4 and 30*b*-4-4.

Referring to FIG. 7B, the embodiment of FIG. 7B basically corresponds to the embodiment of FIG. 7A, except that:

The first acquisition process includes a modified first split exposure acquisition process 30*a*-1-4' and a modified second split exposure acquisition process 30*a*-2-4' instead of the first and second split exposure acquisition process 30*a*-1-4 and 30*a*-2-4, respectively.

In the embodiment of FIG. 7A, the data of the first acquisition process is only output at the end of the seventh or eighth split exposure acquisition process and, thus, for example, a depth sensing application (e.g., object detection) may have to wait relatively long until updated data is available. This may reduce a motion robustness of the ToF system 1 and the depth sensing application.

Hence, the modified first split exposure acquisition process 30*a*-1-4' and the modified second split exposure acquisition process 30*a*-2-4' include a third read-out time interval 37 instead of the second read-out time interval 35.

The split exposure time intervals 36*a* of the modified first split exposure acquisition process 30*a*-1-4' and the modified second split exposure acquisition process 30*a*-2-4' correspond to a subset of subsequent split exposure time intervals 36*a* of the four split exposure time intervals 36*a*, wherein the subset of subsequent split exposure time intervals 36*a* includes the first split exposure time interval 36*a* of the four split exposure time intervals 36*a*.

In the third read-out time interval 37 of split exposure acquisition processes 30*a*-1-4' and 30*a*-2-4', the control 5 controls read-out of the plurality of pixels and accumulation of pixel values of signal contributions acquired during the subset of subsequent split exposure time intervals 36*a*.

Moreover, after the last split exposure time interval 36*a* of the subset of subsequent split exposure time intervals 36*a*, the control 5 controls read-out of the on-hip buffer 8 and output of the accumulated pixel values of signal contributions to the board computer 9.

Hence, instead of waiting for outputting the data in the second acquisition process, the data generated during the first split exposure time intervals 36*a* is accumulated and output to the board computer 9 once the plurality of pixels has been read-out after the last split exposure time interval 36*a* of the subset of subsequent split exposure time intervals 36*a*.

Thus, a motion robustness of the ToF system 1 (and a depth sensing application) may be increased.

In some embodiments, the control 5 controls accumulation of pixel values of signal contributions acquired during split exposure time intervals 30*a*-3-4 and 30*a*-4-4 into a first set, and accumulation of pixel values of signal contributions acquired during split exposure time intervals 30*b*-1-4 and 30*b*-2-4 into a second set.

In such embodiments, the control 5 controls output of the first and second set in the first read-out time intervals 33 of split exposure acquisition processes 30*b*-3-4 and 30*b*-4-4.

Returning to FIG. 2, generally, for instance, the functions of histogram generation, histogram analysis, buffering and accumulation of pixel values of signal contributions of the plurality of pixels may be performed as well by the board computer 9 of the vehicle in some embodiments. In such embodiments, the board computer 9 transmits, for example, a saturation indicator or adaption parameters via the data bus interface 7 to the control 5 which then, accordingly, operates the ToF sensor 3 and adapts the operation of the ToF sensor 3.

Figure 8:
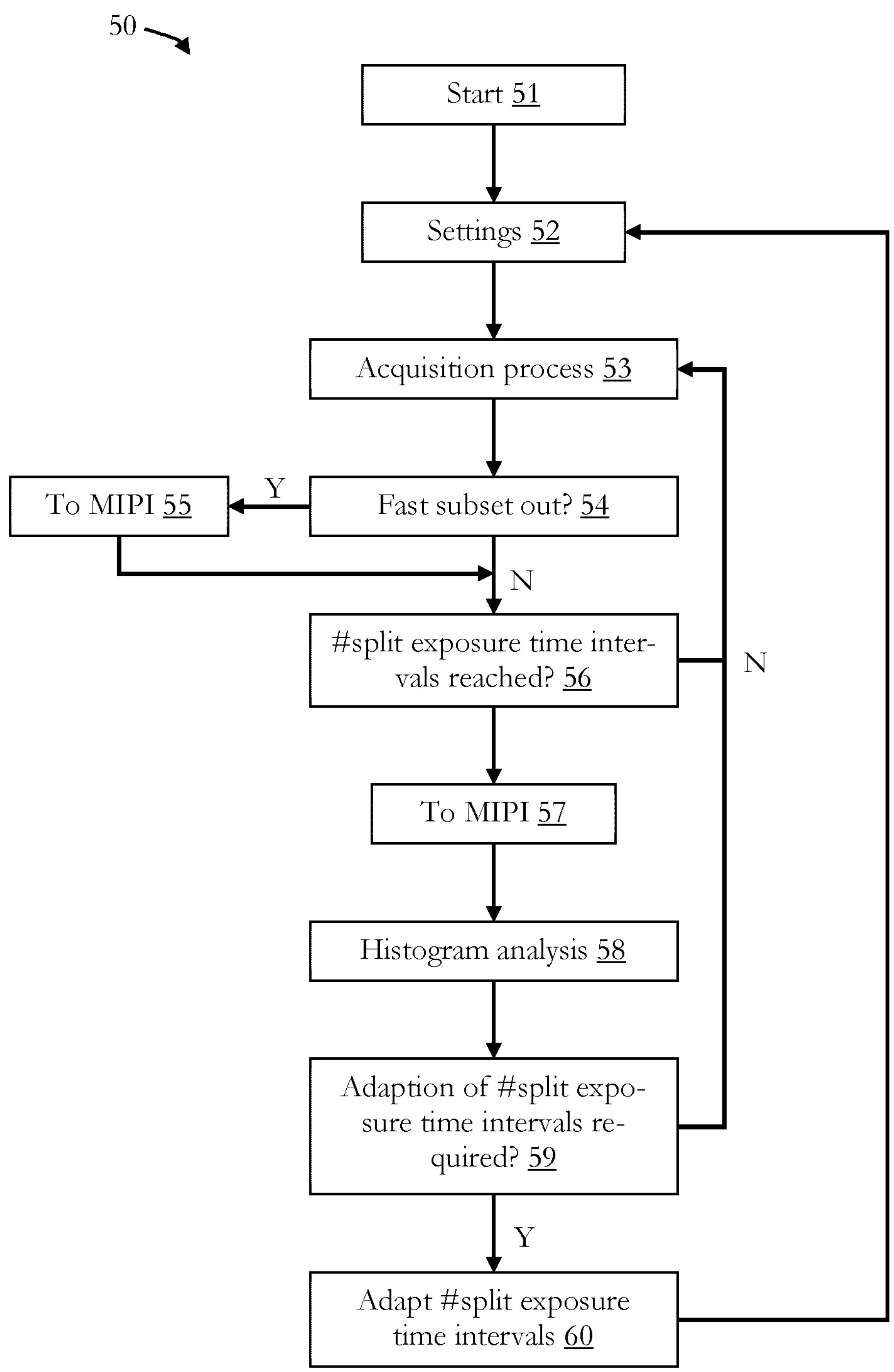
FIG. 8 schematically illustrates in a flow diagram a first embodiment of a control method.

A first embodiment of a control method 50 for a ToF sensor is discussed under reference of FIG. 8 in the following, which schematically illustrates the first embodiment in a flow diagram.

At 51, the control method 50 is started and the control 5 of FIG. 2 determines, at 52, the settings for operation, for example, whether the ToF sensor 3 is to be operated in the continuous exposure mode or in the split exposure mode.

In the following it assumed that the control 5 operates the ToF sensor 3 in the split exposure mode.

At 53, the control 5 performs an acquisition process, for instance, the first split exposure acquisition process 30*a*-1-2 of FIG. 6B or the modified second split exposure acquisition process 30*a*-2-4' of FIG. 7B.

At 54, the control 5 determines whether data of a subset of split exposure time intervals has to be output, for example, to the board computer 9 of FIG. 2. For example, in the case of the first split exposure acquisition process 30*a*-1-2 of FIG. 6B, the control 5 determines that no data has to be output and the control method proceeds with 56. However, for example, in the case of the modified second split exposure acquisition process 30*a*-2-4' of FIG. 7B, the control determines that data has to be output and the data is sent at 55 to the data bus interface 7 (e.g., MIPI) for output.

At 56, the control 5 determines whether all of the plurality of split exposure time intervals is processed. If yes, for example, the accumulated pixel values of signal contributions are read-out of the on-chip buffer 8 and sent to the data bus interface 7, at 57, for output to the board computer 9. If no, the control 5 proceeds with 53.

In this embodiment, the board computer 9 performs the histogram population generation and analysis, at 58, and determines whether the number of the plurality of split exposure time intervals should be adapted. If no, the control 5 proceeds with 53 without change of the settings. If yes, the board computer 9 sends an instruction including adaption parameters to the control 5 which changes the settings at 60.

FIG. 9 schematically illustrates in a flow diagram a second embodiment of a control method 100 for a ToF sensor, which is discussed in the following.

The method may be performed by the control as discussed herein, for example, the control 5 of the embodiment of FIG. 2.

At 101, a ToF sensor is operated in a continuous exposure mode in which a plurality of pixels performs photoelectric conversion during a continuous exposure time interval, as discussed herein.

At 102, read-out of the plurality of pixels after the continuous exposure time interval is controlled, as discussed herein.

At 103, the ToF sensor is operated in a split exposure mode, in response to a detected saturation of pixels of the plurality of pixels, in which the plurality of pixels performs photoelectric conversion during each of a plurality of split exposure time intervals, as discussed herein.

At 104, read-out of the plurality of pixels after each of the plurality of split exposure time intervals is controlled, wherein a length of each of the plurality of split exposure time intervals is shorter than the length of the continuous exposure time interval.

At 105, a number of the plurality of split exposure time intervals is adapted based on a margin of a histogram population of pixel values of the plurality of pixels to a predetermined saturation threshold, as discussed herein.

At 106, accumulation of pixel values of signal contributions of the plurality of pixels acquired during the plurality of split exposure time intervals is controlled, as discussed herein.

At 107, output of the accumulated pixel values of signal contributions to a host device or an external device when the plurality of pixels has been read-out after the last split exposure time interval of the plurality of split exposure time interval is controlled, as discussed herein.

FIG. 10 schematically illustrates in a block diagram an embodiment of a schematic configuration of a vehicle control system 7000 for a vehicle such as the vehicle including the board computer 9 of the embodiment of FIG. 2.

FIG. 10 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 10, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

The in-vehicle information detecting unit 7500 may include a ToF system and a control in accordance with the present disclosure. The outside-vehicle information detecting unit 7400 may include a ToF system and a control in accordance with the present disclosure.

Each of the control units includes: a microcomputer (including e.g. an application processor) that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F (including e.g. a MIPI CSI-2 interface) for performing communication with a device, a sensor, or the like within and without the vehicle by wire communication or radio communication. A functional configuration of the integrated control unit 7600 illustrated in FIG. 10 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 11:
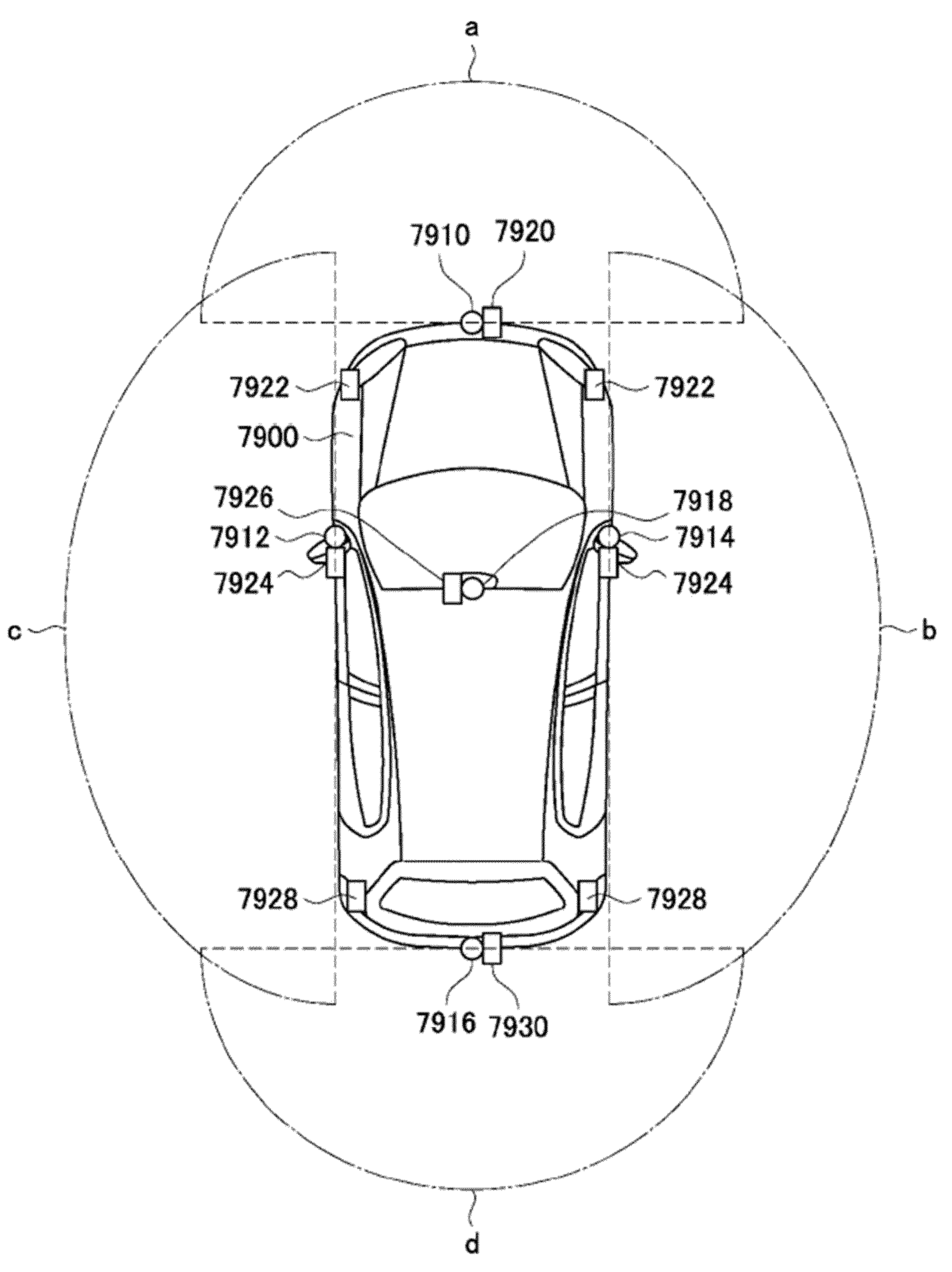
FIG. 11 schematically illustrates a diagram of assistance in explaining an embodiment of installation positions of an outside-vehicle information detecting section and an imaging section.

FIG. 11 schematically illustrates a diagram of assistance in explaining an embodiment of installation positions of an outside-vehicle information detecting section 7420 and the imaging section 7410.

Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 11 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 10, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 may include a time-of-flight system, a mode sequencer circuitry and an application processor in accordance with the present disclosure. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 10, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 10 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A control for a time-of-flight sensor, wherein the time-of-flight sensor includes a plurality of pixels configured to perform photoelectric conversion, wherein the control includes circuitry configured to:

operate the time-of-flight sensor in a continuous exposure mode in which the plurality of pixels performs photoelectric conversion during a continuous exposure time interval and control read-out of the plurality of pixels after the continuous exposure time interval; and operate the time-of-flight sensor in a split exposure mode, in response to a detected saturation of pixels of the plurality of pixels, in which the plurality of pixels performs photoelectric conversion during each of a plurality of split exposure time intervals and control read-out of the plurality of pixels after each of the plurality of split exposure time intervals, wherein a length of each of the plurality of split exposure time intervals is shorter than the length of the continuous exposure time interval.

(2) The control of (1), wherein the circuitry is further configured to control a number of the plurality of split exposure time intervals based on a number of saturated pixels.

(3) The control of (1) or (2), wherein the circuitry is further configured to adapt a number of the plurality of split exposure time intervals based on a margin of a histogram population of pixel values of the plurality of pixels to a predetermined saturation threshold.

(4) The control of anyone of (1) to (3), wherein the circuitry is further configured to adapt a number of the plurality of split exposure time intervals based on a margin of a histogram population of accumulated pixel values of signal contributions of the plurality of pixels to a predetermined saturation threshold.

(5) The control of anyone of (1) to (4), wherein the circuitry is further configured to control accumulation of pixel values of signal contributions of the plurality of pixels acquired during the plurality of split exposure time intervals.

(6) The control of (5), wherein the circuitry is further configured to control output of the accumulated pixel values of signal contributions to a host device or an external device when the plurality of pixels has been read-out after the last split exposure time interval of the plurality of split exposure time intervals.

(7) The control of anyone of (1) to (6), wherein the circuitry is further configured to control accumulation of pixel values of signal contributions acquired during a subset of subsequent split exposure time intervals of the plurality of split exposure time intervals, wherein the subset of subsequent split exposure time intervals includes the first split exposure time interval of the plurality of split exposure time intervals.

(8) The control of (7), wherein the circuitry is further configured to control output of the accumulated pixel values of signal contributions to a host device or an external device once the plurality of pixels has been read-out after the last split exposure time interval of the subset of subsequent split exposure time intervals.

(9) The control of anyone of (5) to (8), wherein the pixel values of signals contributions are accumulated in an on-chip buffer of the time-of-flight sensor for output to a host device or an external device.

(10) The control of anyone of (1) to (9), wherein the circuitry is further configured to control output of pixel values of signal contributions acquired during a split exposure time interval to a host device or an external device once the plurality of pixels has been read-out after the respective split exposure time interval.

(11) The control of anyone of (1) to (10), wherein the circuitry is further configured to detect the saturation of the pixels of the plurality of pixels.

(12) The control of (11), wherein the saturation of the pixels of the plurality of pixels is detected based on an analysis of a histogram population of pixel values of the plurality of pixels.

(13) The control of anyone of (1) to (12), wherein a sum of the lengths of the plurality of split exposure time intervals is equal to the continuous exposure time interval.

(14) The control of anyone of (1) to (13), wherein each split exposure time interval of the plurality of split exposure time intervals has the same length.

(15) A control method for a time-of-flight sensor, wherein the time-of-flight sensor includes a plurality of pixels configured to perform photoelectric conversion, wherein the control method includes:

operating the time-of-flight sensor in a continuous exposure mode in which the plurality of pixels performs photoelectric conversion during a continuous exposure time interval and controlling read-out of the plurality of pixels after the continuous exposure time interval; and operating the time-of-flight sensor in a split exposure mode, in response to a detected saturation of pixels of the plurality of pixels, in which the plurality of pixels performs photoelectric conversion during each of a plurality of split exposure time intervals and controlling read-out of the plurality of pixels after each of the plurality of split exposure time intervals, wherein a length of each of the plurality of split exposure time intervals is shorter than the length of the continuous exposure time interval.

(16) The control method of (15), further including: controlling a number of the plurality of split exposure time intervals based on a number of saturated pixels.

(17) The control method of (15) or (16), further including:

adapting a number of the plurality of split exposure time intervals based on a margin of a histogram population of pixel values of the plurality of pixels to a predetermined saturation threshold.

(18) The control method of anyone of (15) to (17), further including:

adapting a number of the plurality of split exposure time intervals based on a margin of a histogram population of accumulated pixel values of signal contributions of the plurality of pixels to a predetermined saturation threshold.

(19) The control method of anyone of (15) to (18), further including:

controlling accumulation of pixel values of signal contributions of the plurality of pixels acquired during the plurality of split exposure time intervals.

(20) The control method of (19), further including:

controlling output of the accumulated pixel values of signal contributions to a host device or an external device when the plurality of pixels has been read-out after the last split exposure time interval of the plurality of split exposure time intervals.

(21) A computer program comprising program code causing a computer to perform the method according to anyone of (15) to (20), when being carried out on a computer.

(22) A non-transitory computer-readable recording medium that stores therein a computer program product, which, when executed by a processor, causes the method according to anyone of (15) to (20) to be performed.

The invention claimed is:

1. A control for a time-of-flight sensor, the time-of-flight sensor including a plurality of pixels configured to perform photoelectric conversion, the control comprising:

circuitry configured to operate the time-of-flight sensor in a continuous exposure mode in which the plurality of pixels performs photoelectric conversion during a continuous exposure time interval and control read-out of the plurality of pixels after the continuous exposure time interval; and operate the time-of-flight sensor in a split exposure mode, in response to a detected saturation of pixels of the plurality of pixels, in which the plurality of pixels performs photoelectric conversion during each of a plurality of split exposure time intervals and control read-out of the plurality of pixels after each one of the plurality of split exposure time intervals, wherein a length of each of the plurality of split exposure time intervals is shorter than the length of the continuous exposure time interval.

2. The control according to claim 1, wherein the circuitry is further configured to control a number of the plurality of split exposure time intervals based on a number of saturated pixels.

3. The control according to claim 1, wherein the circuitry is further configured to adapt a number of the plurality of split exposure time intervals based on a margin of a histogram population of pixel values of the plurality of pixels to a predetermined saturation threshold.

4. The control according to claim 1, wherein the circuitry is further configured to adapt a number of the plurality of split exposure time intervals based on a margin of a histogram population of accumulated pixel values of signal contributions of the plurality of pixels to a predetermined saturation threshold.

5. The control according to claim 1, wherein the circuitry is further configured to control accumulation of pixel values of signal contributions of the plurality of pixels acquired during each one of the plurality of split exposure time intervals and read-out after each one of the plurality of split exposure time intervals.

6. The control according to claim 5, wherein the circuitry is further configured to control output of the accumulated pixel values of signal contributions to a host device or an external device when the plurality of pixels has been read-out after the last split exposure time interval of the plurality of split exposure time intervals.

7. The control according to claim 1, wherein the circuitry is further configured to control accumulation of pixel values of signal contributions acquired during a subset of subsequent split exposure time intervals of the plurality of split exposure time intervals, wherein the subset of subsequent split exposure time intervals includes the first split exposure time interval of the plurality of split exposure time intervals.

8. The control according to claim 7, wherein the circuitry is further configured to control output of the accumulated pixel values of signal contributions to a host device or an external device once the plurality of pixels has been read-out after the last split exposure time interval of the subset of subsequent split exposure time intervals.

9. The control according to claim 5, wherein the pixel values of signals contributions are accumulated in an on-chip buffer of the time-of-flight sensor for output to a host device or an external device.

10. The control according to claim 1, wherein the circuitry is further configured to control output of pixel values of signal contributions acquired during a split exposure time interval to a host device or an external device once the plurality of pixels has been read-out after the respective split exposure time interval.

11. The control according to claim 1, wherein the circuitry is further configured to detect the saturation of the pixels of the plurality of pixels.

12. The control according to claim 11, wherein the saturation of the pixels of the plurality of pixels is detected based on an analysis of a histogram population of pixel values of the plurality of pixels.

13. The control according to claim 1, wherein a sum of the lengths of the plurality of split exposure time intervals is equal to the continuous exposure time interval.

14. The control according to claim 1, wherein each split exposure time interval of the plurality of split exposure time intervals has the same length.

15. The control according to claim 7, wherein the pixel values of signals contributions are accumulated in an on-chip buffer of the time-of-flight sensor for output to a host device or an external device.

16. A control method for a time-of-flight sensor, the time-of-flight sensor including a plurality of pixels configured to perform photoelectric conversion, the control method comprising:

operating the time-of-flight sensor in a continuous exposure mode in which the plurality of pixels performs photoelectric conversion during a continuous exposure time interval and controlling read-out of the plurality of pixels after the continuous exposure time interval; and operating the time-of-flight sensor in a split exposure mode, in response to a detected saturation of pixels of the plurality of pixels, in which the plurality of pixels performs photoelectric conversion during each of a plurality of split exposure time intervals and controlling read-out of the plurality of pixels after each one of the plurality of split exposure time intervals, wherein a length of each of the plurality of split exposure time intervals is shorter than the length of the continuous exposure time interval.

17. The control method according to claim 16, further comprising: controlling a number of the plurality of split exposure time intervals based on a number of saturated pixels.

18. The control method according to claim 16, further comprising:

adapting a number of the plurality of split exposure time intervals based on a margin of a histogram population of pixel values of the plurality of pixels to a predetermined saturation threshold.

19. The control method according to claim 16, further comprising:

adapting a number of the plurality of split exposure time intervals based on a margin of a histogram population of accumulated pixel values of signal contributions of the plurality of pixels to a predetermined saturation threshold.

20. The control method according to claim 16, further comprising:

controlling accumulation of pixel values of signal contributions of the plurality of pixels acquired during each one of the plurality of split exposure time intervals and read-out after each one of the plurality of split exposure time intervals.

21. The control method according to claim 20, further comprising:

controlling output of the accumulated pixel values of signal contributions to a host device or an external device when the plurality of pixels has been read-out after the last split exposure time interval of the plurality of split exposure time intervals.

* * * * *